United States Patent
Patel et al.

(10) Patent No.: US 10,725,145 B2
(45) Date of Patent: Jul. 28, 2020

(54) MULTI-DIMENSIONAL LOCATION OF AN OBJECT USING MULTIPLE ELECTRICAL DEVICES

(71) Applicant: Eaton Intelligent Power Limited, Dublin (IE)

(72) Inventors: Vrajesh Upendrabhai Patel, Tucker, GA (US); Leonardo Enrique Matute, Atlanta, GA (US)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 15/969,637

(22) Filed: May 2, 2018

(65) Prior Publication Data

US 2018/0321354 A1    Nov. 8, 2018

Related U.S. Application Data

(60) Provisional application No. 62/501,479, filed on May 4, 2017.

(51) Int. Cl.
*G01S 5/06* (2006.01)
*G01S 13/74* (2006.01)
*G01S 5/00* (2006.01)
*G01S 5/02* (2010.01)
*G01S 5/14* (2006.01)

(52) U.S. Cl.
CPC .............. *G01S 5/06* (2013.01); *G01S 5/0036* (2013.01); *G01S 5/0221* (2013.01); *G01S 5/0226* (2013.01); *G01S 5/14* (2013.01); *G01S 13/74* (2013.01)

(58) Field of Classification Search
CPC ........ H04W 4/028; H04W 4/029; H04W 4/04
See application file for complete search history.

(56) References Cited

U.S. PATENT DOCUMENTS 5,986,392 A    11/1999  Kim
6,418,938 B1    7/2002  Fleischhauer et al.
(Continued)

FOREIGN PATENT DOCUMENTS

EP          2474834         7/2012
WO     WO 2007/072285      6/2007
(Continued)

OTHER PUBLICATIONS

International search report for PCT/IB2018/000674, dated Oct. 10, 2018.
(Continued)

*Primary Examiner* — Wen W Huang
(74) *Attorney, Agent, or Firm* — King & Spalding LLP

(57) ABSTRACT

A system for locating an object in a volume of space can include multiple electrical devices, where each electrical device includes a transceiver. The system can also include a controller communicably coupled to the electrical devices. The controller can instruct the electrical devices to broadcast, using the transceiver, multiple first signals in the volume of space. The controller can also collect data associated with multiple second signals received by the transceiver of the electrical devices, where the second signals are sent by the object in response to the first signals. The controller can further determine, using the data, a multi-dimensional location of the object in the volume of space.

20 Claims, 11 Drawing Sheets

(56) References Cited

U.S. PATENT DOCUMENTS

| | | | |
|---|---|---|---|
| 6,784,826 B2 | 8/2004 | Kane | |
| 7,275,517 B2 | 10/2007 | Kurita et al. | |
| 7,560,502 B2 | 7/2009 | Gerster et al. | |
| 10,422,848 B1* | 9/2019 | Li | G01S 5/08 |
| 2002/0122006 A1 | 9/2002 | Crawford | |
| 2004/0183726 A1 | 9/2004 | Theobold | |
| 2005/0143092 A1* | 6/2005 | Tamaki | H04W 64/00 455/456.1 |
| 2005/0156794 A1 | 7/2005 | Theobold | |
| 2007/0262872 A1 | 11/2007 | Carrender | |
| 2012/0050017 A1 | 3/2012 | Barry | |
| 2012/0178471 A1* | 7/2012 | Kainulainen | G01S 5/0009 455/456.1 |
| 2012/0218978 A1* | 8/2012 | Ishidoshiro | F21V 33/0052 370/338 |
| 2012/0302261 A1* | 11/2012 | Tinnakornsrisuphap | G01S 5/0226 455/456.4 |
| 2013/0170374 A1 | 7/2013 | Aljadeff | |
| 2013/0260693 A1* | 10/2013 | Un | G01S 5/02 455/67.11 |
| 2013/0342402 A1* | 12/2013 | Pesonen | G01S 5/0294 342/451 |
| 2014/0327579 A1 | 11/2014 | Hart | |
| 2015/0099538 A1 | 4/2015 | Wang et al. | |
| 2015/0334676 A1* | 11/2015 | Hart | H04W 4/029 455/456.1 |
| 2016/0088444 A1* | 3/2016 | David | H04W 4/029 455/456.1 |
| 2016/0139237 A1 | 5/2016 | Connolly et al. | |
| 2016/0286624 A1* | 9/2016 | Patel | H05B 37/0218 |
| 2016/0345286 A1 | 11/2016 | Jamieson | |
| 2018/0052217 A1 | 2/2018 | Jonsson | |
| 2018/0096179 A1* | 4/2018 | Dang | G01S 5/02 |

FOREIGN PATENT DOCUMENTS

| | | |
|---|---|---|
| WO | WO 2014/131074 | 9/2014 |
| WO | WO 2015/030816 | 3/2015 |

OTHER PUBLICATIONS

International search report for PCT/IB2018/000575, dated Aug. 23, 2018.

Galov, Aleksandr et al. "Simultaneous Localization and Mapping in Indoor Positioning Systems Based on Round Trip Time-of-Flight Measurements and Inertial Navigation". 2014 International Conference on Indoor Positioning and Indoor Navigation, Oct. 27-30, 2014. pp. 457-464.

Casacuberta, Ivan et al. "Time-of-Flight Positioning Using the Existing Wireless Local Area Network Infrastructure". 2012 International Conference on Indoor Positioning and Indoor Navigation, Nov. 13-15, 2012. 8 pages.

Dong, Fang et al. "A TOF and Kalman Filtering Joint Algorithm for IEEE802.15.4a UWB Locating". College of Information Science & Technology, Huainan University. Haikou, China. pp. 948-951.

Koenig, Stefan et al. "Multipath Mitigation for Indoor Localization Based on IEEE 802.11 Time-of-Flight Measurements". Interactive Communication Systems (ICS), University of Tuebingen, Germany. 8 pages.

International search report for PCT/EP2019/025092, dated Sep. 30, 2019.

* cited by examiner

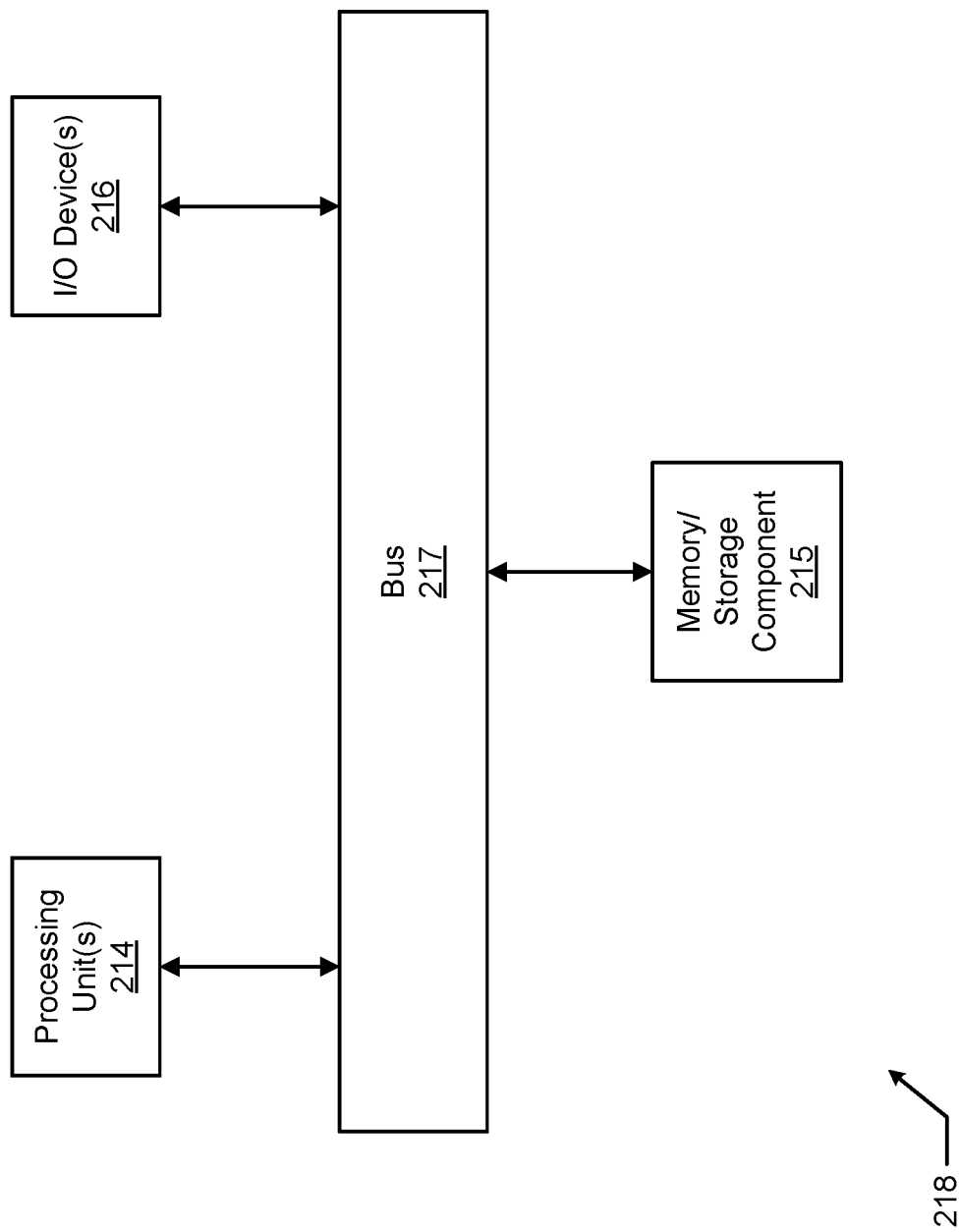

FIG. 3B

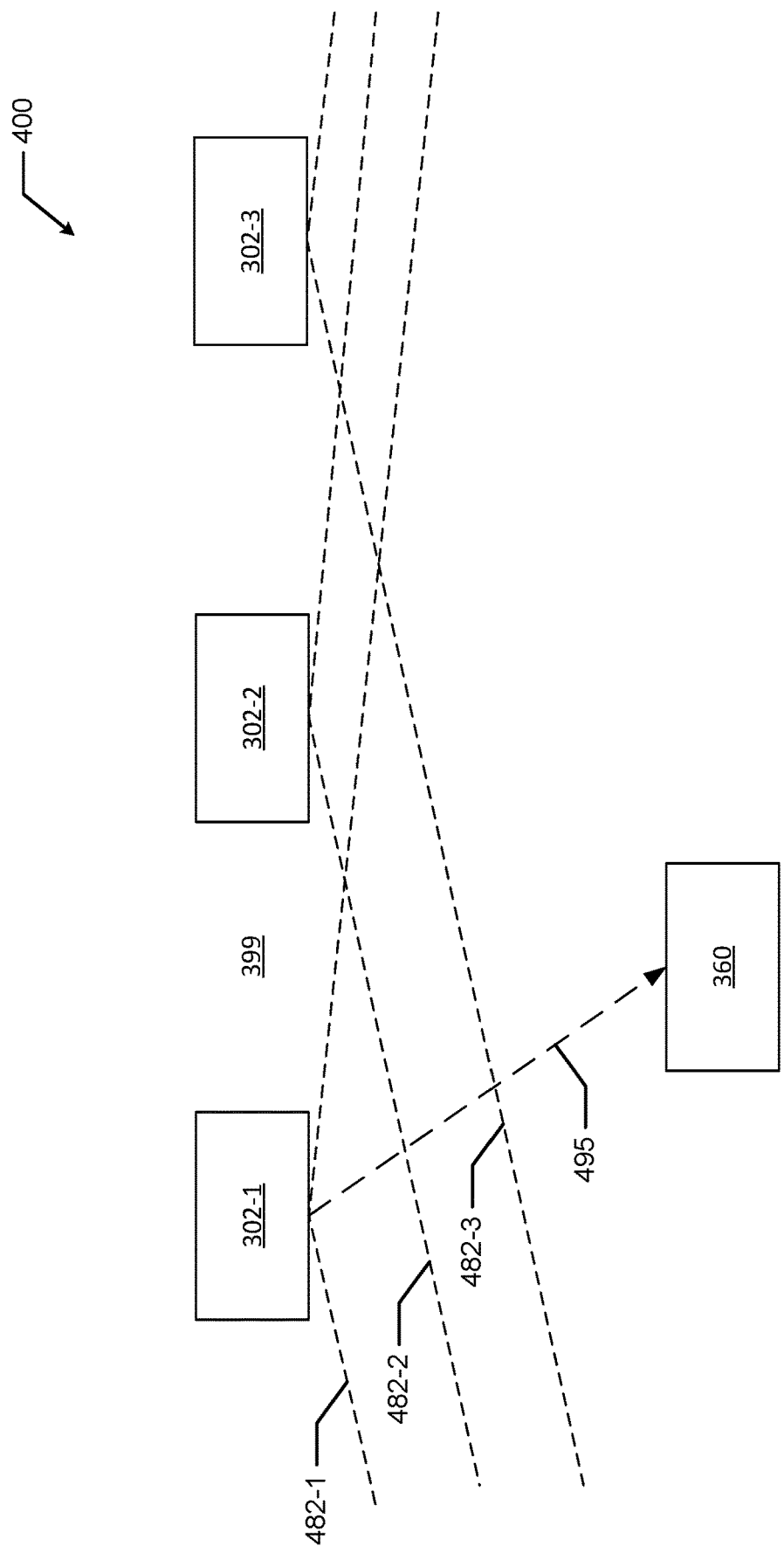

MULTI-DIMENSIONAL LOCATION OF AN OBJECT USING MULTIPLE ELECTRICAL DEVICES

CROSS-REFERENCE TO RELATED APPLICATIONS

This application claims priority under 35 U.S.C. § 119 to U.S. Provisional Patent Application Ser. No. 62/501,479, titled "Multi-Dimensional Location of an Object Using Multiple Light Fixtures" and filed on May 4, 2017, the entire contents of which are hereby incorporated herein by reference.

TECHNICAL FIELD

Embodiments described herein relate generally to locating objects in a space, and more particularly to systems, methods, and devices for locating objects in a space using multiple electrical devices.

BACKGROUND

Different methods are used to locate an object within a volume of space. For example, when signals (e.g. radio frequency (RF) signals) are involved, the time of flight (ToF) of each signal can be measured to help determine the location of an object within a volume of space. In such cases, only a fixed number of channels are used. In addition, in such cases, there is no acknowledgement or verification as to whether a signal was properly received. Further, embodiments currently using signals in the art to locate an object have difficulty determining a two- or three-dimensional coordinate of the object.

SUMMARY

In general, in one aspect, the disclosure relates to a system for locating an object in a volume of space. The system can include multiple electrical devices, where each electrical device includes a transceiver. The system can also include a controller communicably coupled to the electrical devices. The controller can instruct the electrical devices to broadcast, using the transceiver, multiple first signals in the volume of space. The controller can also collect data associated with multiple second signals received by the transceiver of the electrical devices, where the second signals are sent by the object in response to the first signals. The controller can further determine, using the data, a multi-dimensional location of the object in the volume of space.

In another aspect, the disclosure can generally relate to an object located in a volume of space. The object can include a communication module that is configured to receive a first signal from a first electrical device. The communication module can also be configured to interpret the first signal. The communication module can further be configured to generate a second signal in response to the first signal, where the second signal includes an identification of the object and a first time stamp. The communication module can also be configured to broadcast the second signal to the electrical devices. The second signal can be received by the first electrical device and ignored by a first remainder of the electrical devices. The second signal can be used by a controller coupled to the first electrical device to determine a location of the object in the volume of space.

In yet another aspect, the disclosure can generally relate to a controller used to locate an object in a volume of space. The controller can include a control engine communicably coupled to multiple electrical devices located in the volume of space. The control engine can instruct a first electrical device to broadcast a first signal in the volume of space. The control engine can also receive first data associated with a second signal from the first electrical device, where the second signal is sent by the object in response to the first signal. The control engine can further instruct a second electrical device to broadcast a third signal in the volume of space. The control engine can also receive second data associated with a fourth signal from the second electrical device, where the fourth signal is sent by the object in response to the third signal. The control engine can further determine, using the first data and the second data, a multi-dimensional location of the object in the volume of space.

These and other aspects, objects, features, and embodiments will be apparent from the following description and the appended claims.

BRIEF DESCRIPTION OF THE DRAWINGS

The drawings illustrate only example embodiments of multi-dimensional location of an object using multiple electrical devices and are therefore not to be considered limiting of its scope, as multi-dimensional location of an object using multiple electrical devices may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles. In the drawings, reference numerals designate like or corresponding, but not necessarily identical, elements.

FIG. 2 shows a computing device in accordance with certain example embodiments.

FIGS. 3A and 3B show a side and top view, respectively, of a system in which an object is located in a volume of space in accordance with certain example embodiments.

FIG. 4 shows the system of FIGS. 3A and 3B when a signal is sent by one the light fixtures in accordance with certain example embodiments.

DETAILED DESCRIPTION OF EXAMPLE EMBODIMENTS

Figure 1:
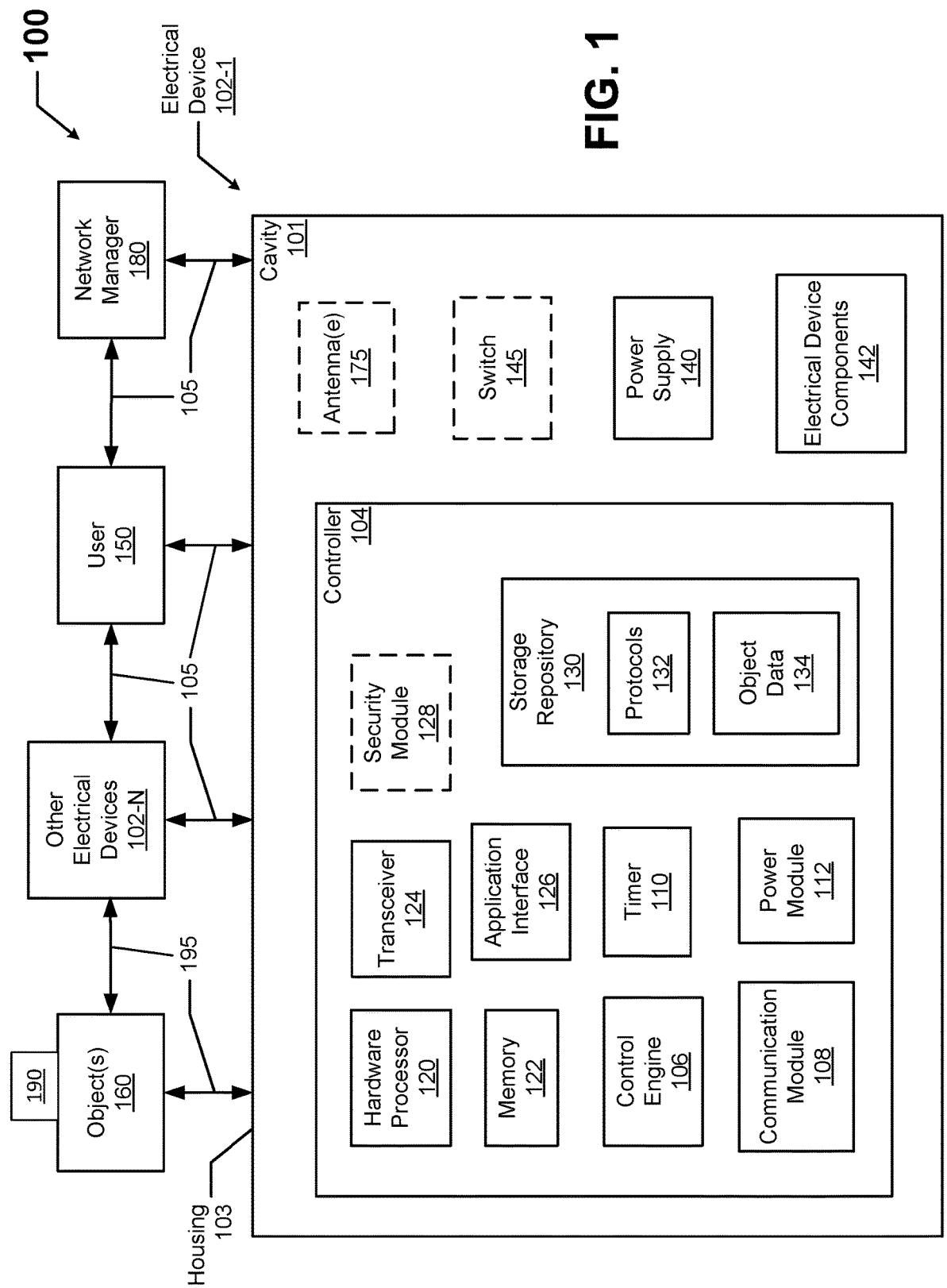
FIG. 1 shows a diagram of a system that includes an electrical device in accordance with certain example embodiments.

The example embodiments discussed herein are directed to systems, methods, and devices for multi-dimensional location of an object using multiple electrical devices. While example embodiments are described herein as using multiple light fixtures to locate an object in a volume of space, example embodiments can use one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera.

Further, while example embodiments use the trilateration method of ToF, which is described in more detail below with respect to FIGS. 3A-10, to determine the location of an object in a volume of space, other location methods, including but not limited to triangulation methods (e.g., Angle of Arrival, Angle of Departure), can be used with example embodiments. With triangulation, rather than measuring the distance and/or time that each signal travels between an object and an antenna, the angle of the signals is measured, and those angles are used to determine the location of the object. Also, other trilateration methods, such as measuring distance traveled by the signals traveling between an object and an antenna, can be used with example embodiments.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals, example embodiments can be used with any of a number of other types of signals, including but not limited to visible light signals, LiFi, WiFi, Bluetooth, RFID, ultraviolet waves, microwaves, and infrared signals.

Example embodiments of electrical devices described herein can use one or more of a number of different types of light sources, including but not limited to light-emitting diode (LED) light sources, fluorescent light sources, organic LED light sources, incandescent light sources, and halogen light sources. Therefore, electrical devices described herein, even in hazardous locations, should not be considered limited to a particular type of light source.

A user may be any person that interacts with an electrical device and/or object in a volume of space. Specifically, a user may program, operate, and/or interface with one or more components (e.g., a controller, a network manager) associated with a system using example embodiments. Examples of a user may include, but are not limited to, an engineer, an electrician, an instrumentation and controls technician, a mechanic, an operator, a consultant, a contractor, an asset, a network manager, and a manufacturer's representative.

As defined herein, an object can be any unit or group of units. An object can move on its own, is capable of being moved, or is stationary. Examples of an object can include, but are not limited to, a person (e.g., a user, a visitor, an employee), a part (e.g., a motor stator, a cover), a piece of equipment (e.g., a fan, a container, a table, a chair), or a group of parts of equipment (e.g., a pallet stacked with inventory).

Example embodiments provide a highly accurate two- or three-dimensional location of an object in a volume of space. Further, example embodiments can provide high locational accuracy (as compared, for example, to using RSSI (Receive Signal Strength Indicator)). In addition, example embodiments, provide a high level of data security if such security is desired by a user. Example embodiments are also more reliable, using low amounts of power on demand.

In certain example embodiments, electrical devices used for multi-dimensional location of an object are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of multi-dimensional location of an object using multiple electrical devices will be described more fully hereinafter with reference to the accompanying drawings, in which example embodiments of multi-dimensional location of an object using multiple electrical devices are shown. Multi-dimensional location of an object using multiple electrical devices may, however, be embodied in many different forms and should not be construed as limited to the example embodiments set forth herein. Rather, these example embodiments are provided so that this disclosure will be thorough and complete, and will fully convey the scope of multi-dimensional location of an object using multiple electrical devices to those or ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of multi-dimensional location of an object using multiple electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 in accordance with certain example embodiments. The system 100 can include one or more objects 160, a user 150, a network manager 180, and multiple electrical devices 102. Each electrical device 102 (e.g., electrical device 102-1) can include a controller 104, one or more optional antennae 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in an example electrical device 102. Any component of the example electrical device 102 can be discrete or combined with one or more other components of the electrical device 102. For example, each electrical device 102 in the system 100 can have its own controller 104. Alternatively, one controller 104 can be used to control multiple electrical devices 102 in the system.

The user 150 is the same as a user defined above. The user 150 can use a user system (not shown), which may include a display (e.g., a GUI). The user 150 interacts with (e.g., sends data to, receives data from) the controller 104 of an electrical device 102 via the application interface 126 (described below). The user 150 can also interact with a network manager 180 and/or one or more of the objects 160. Interaction between the user 150 and the electrical device 102, the network manager 180, and the objects 160 is conducted using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication link 105 can transmit signals (e.g., power signals, communication signals, control signals, data) between the electrical devices 102, the user 150, and the network manager 180. By contrast, the electrical devices 102 of the system 100 can interact with the one or more objects 160 using location signals 195 (also sometimes called RF signals 195 herein), as discussed below. The one or more objects 160 can communicate with the user 150 and/or the network manager 180 using the communication links 105.

The network manager 180 is a device or component that controls all or a portion of the system 100 that includes the controller 104 of at least one of the electrical devices 102. The network manager 180 can be substantially similar to the controller 104. Alternatively, the network manager 180 can include one or more of a number of features in addition to, or altered from, the features of the controller 104 described below.

The one or more objects 160 can be any of a number of people and/or devices, as described above. Each object 160 can include a communication device 190 (also sometimes called a tag, a beacon, or other name known in the art, depending on the configuration of the communication device 190), which can receive RF signals 195 from and subsequently send RF signals 195 to multiple electrical devices 102. The communication device 190 can include one or more of a number of components (e.g., transceiver, antenna, switch, power module) and/or have the functionality described below with respect to a controller 104 and/or an associated electrical device 102. For example, the communication device 190 can include a control engine, a transceiver, and an antenna to allow the communication device 190 to send and receive RF signals 195 with one or more electrical devices 102 in the system 100.

Using example embodiments, the communication device 190 of the object 160 can be in sleep mode for a predefined interval, at which point it stays awake for a period of time or until the communication device 190 receives a RF signal 195 broadcast by one or more electrical devices 102. When this occurs, the communication device 190 can turn on long enough to interpret the initial RF signal 195, and then generate and send its own RF signal 195 to the electrical devices 102 in response to the initial RF signal 195. This response RF signal 195 can include a UUID as well as a reference (e.g., signal code) to the initial RF signal 195 and/or the electrical device 102 that sent the initial RF signal 195. Once the response RF signal 195 is sent by the communication device 190, the communication device 190 can go back into sleep mode, thereby reserving a considerable amount of power. In the current art, the communication device 190 of an object only transmits RF signals, wasting considerable amounts of energy (e.g., battery).

The communication device 190 can use one or more of a number of communication protocols in sending and receiving the RF signals 195 with the electrical devices 102. In certain example embodiments, an object 160 can include a battery (a form of power supply or power module) that is used to provide power, at least in part, to some or all of the rest of the object 160.

The user 150, the network manager 180, and/or the other electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to the user 150, the network manager 180, and/or one or more of the other electrical devices 102-N. The user 150, the network manager 180, and/or one or more of the other electrical devices 102-N can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, and/or one or more of the other electrical devices 102-N can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). For example, if the electrical device 102-1 is located in an explosive environment, the housing 103 can be explosion-proof. According to applicable industry standards, an explosion-proof enclosure is an enclosure that is configured to contain an explosion that originates inside, or can propagate through, the enclosure.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), an optional switch 145, one or more optional antennae 175, the power supply 140, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with the user 150, the network manager 180, one or more of the objects 160, and one or more of the other electrical devices 102-N within the system 100. In one or more example embodiments, the storage repository 130 stores one or more protocols 132 and object data 134. The protocols 132 can be any procedures (e.g., a series of method steps) and/or other similar operational procedures that the control engine 106 of the controller 104 follows based on certain conditions at a point in time. The protocols 132 can also include any of a number of communication protocols that are used to send and/or receive data between the controller 104 and the user 150, the network manager 180, the one or more of the other electrical devices 102-N, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132 and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, the objects 160, and the other electrical devices 102-N in the system 100. More specifically, the control engine 106 sends information to and/or receives information from the storage repository 130 in order to communicate with the user 150, the network manager 180, the objects 160, and the other electrical devices 102-N. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., an object 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to send RF signals 195 and/or stop sending RF signals 195 to one or more objects 160 in the system 100. This example provides another instance where the control engine 106 can conserve power used by the controller 104 and other components (e.g., the objects 160) of the system 100.

The control engine 106 can determine when to broadcast one or more RF signals 195 in an attempt to locate an object 160. To conserve energy, the control engine 106 does not constantly broadcast RF signals 195, but rather only does so at discrete times. The control engine 106 can broadcast a RF signal 195 based on one or more of a number of factors, including but not limited to passage of time, the occurrence of an event, instructions from a user 150, and a command received from the network manager 180. The control engine 106 can coordinate with the controllers 104 of one or more of the other electrical devices 102-N and/or directly control one or more of the other electrical devices 102-N to broadcast multiple RF signals 195. The control engine 106 can also determine the ToF of one or more of the RF signals 195 that are broadcast by the object 160 in response to the RF signal 195 broadcast by the electrical device 102-1.

In some cases, the control engine 106 of the electrical device 102-1 (or, in some cases, the network manager 180 communicating with the controller 104) can locate the object 160 based on the multiple RF signals 195 sent by the object 160 in response to the multiple RF signals 195 broadcast by the electrical devices 102. To accomplish this, the control engine 106 obtains the multiple RF signals 195 (directly and/or from another control engine 106 from one or more of the other electrical devices 102-N) broadcast by the object 160 and uses one or more protocols 132 and/or algorithms (part of data stored in the storage repository 130) to determine the multi-dimensional location of the object 160.

For example, the protocols and/or algorithms used by the control engine 106 can require the control engine 106 to determine the delta ToF of each RF signal 195 by determining exactly when each RF signal 195 was sent by the electrical devices and when each corresponding RF signal was received by the electrical devices 102. Using values for the amount of time the object 160 processes each RF signal 195 received and generates each corresponding RF signal 195 in reply, as well as the known location of each electrical device 102 that send and received RF signals 195, the precise multi-dimensional location of an object 160 can be determined.

If two electrical devices 102 are used, and if each of those two electrical devices 102 have only a single communication point (e.g., antenna 175), then a two-dimensional location of an object 160 can be obtained by the control engine 106. If three or more electrical devices 102 are used, then a three-dimensional location of an object 160 can be obtained by the control engine 106. Similarly, if there are only two electrical devices 102 used, and if one or both of those electrical devices have multiple communication points (e.g., antennae 175), then the location of the object 160 can be defined in three dimensions by the control engine 106. An example of how this can work is provided below with respect to FIGS. 3A-6.

The control engine 106 can provide control, communication, and/or other similar signals to the user 150, the network manager 180, the other electrical devices 102-N, and one or more of the objects 160. Similarly, the control engine 106 can receive control, communication, and/or other similar signals from the user 150, the network manager 180, the other electrical devices 102-N, and one or more of the objects 160. The control engine 106 can communicate with each object 160 automatically (for example, based on one or more algorithms stored in the storage repository 130) and/or based on control, communication, and/or other similar signals received from another device (e.g., the network manager 180, another electrical device 102) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the communication protocols 132 used to communicate between the controller 104 and the user 150, the network manager 180, the other electrical devices 102-N, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I$^2$C), and a pulse width modulator (PWM).

By using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150, the network manager 180, and the other electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, the other electrical devices 102-N, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure the ToF for multiple RF signals 195 simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150, the network manager 180, and/or one or more of the other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, the other electrical devices 102-N, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, the other electrical devices 102-N, and/or the objects 160.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150, the network manager 180, the other electrical devices 102-N, and/or the objects 160 can be part of the object data 134 (or similar areas) of the storage repository 130.

Optionally, in one or more example embodiments, the security module 128 secures interactions between the controller 104, the user 150, the network manager 180, the other electrical devices 102-N, and/or the objects 160. More specifically, the security module 128 authenticates communication from software based on security keys verifying the identity of the source of the communication. For example, user software may be associated with a security key enabling the software of the user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140 and one or more electrical device components 142. The electrical device components 142 of the electrical device 102-1 are devices and/or components typically found in the electrical device 102-1 to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102-1 provides power to one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1. In addition, or in the alternative, the power supply 140 can be a source of power in itself. For example, the power supply 140 can be a battery, a localized photovoltaic power system, or some other source of independent power.

As discussed above, the electrical device 102 can include one or more antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the optional switch 145 when multiple antenna 175 are involved, an electric current oscillating at radio frequency (i.e. a high frequency alternating current (AC)) to the terminals of the antenna 175, and the antenna 175 radiates the energy from the current as RF signals 195. In reception, an antenna 175, when included in the electrical device 102, intercepts some of the power of RF signals 195 in order to produce a tiny voltage at its terminals, that is applied to a receiver (e.g., transceiver 124), in some cases through an optional switch 145, to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

When there are multiple antennae 175 (or other forms of multiple communication points) as part of the electrical device 102, there can also be an optional switch 145, which allows for selection of one communication point at a given point in time. In such a case, each antenna 175 can be electrically coupled to the switch 145, which in turn is electrically coupled to the transceiver 124. The optional switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state (position) and a closed state (position).

In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102-1 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3A:
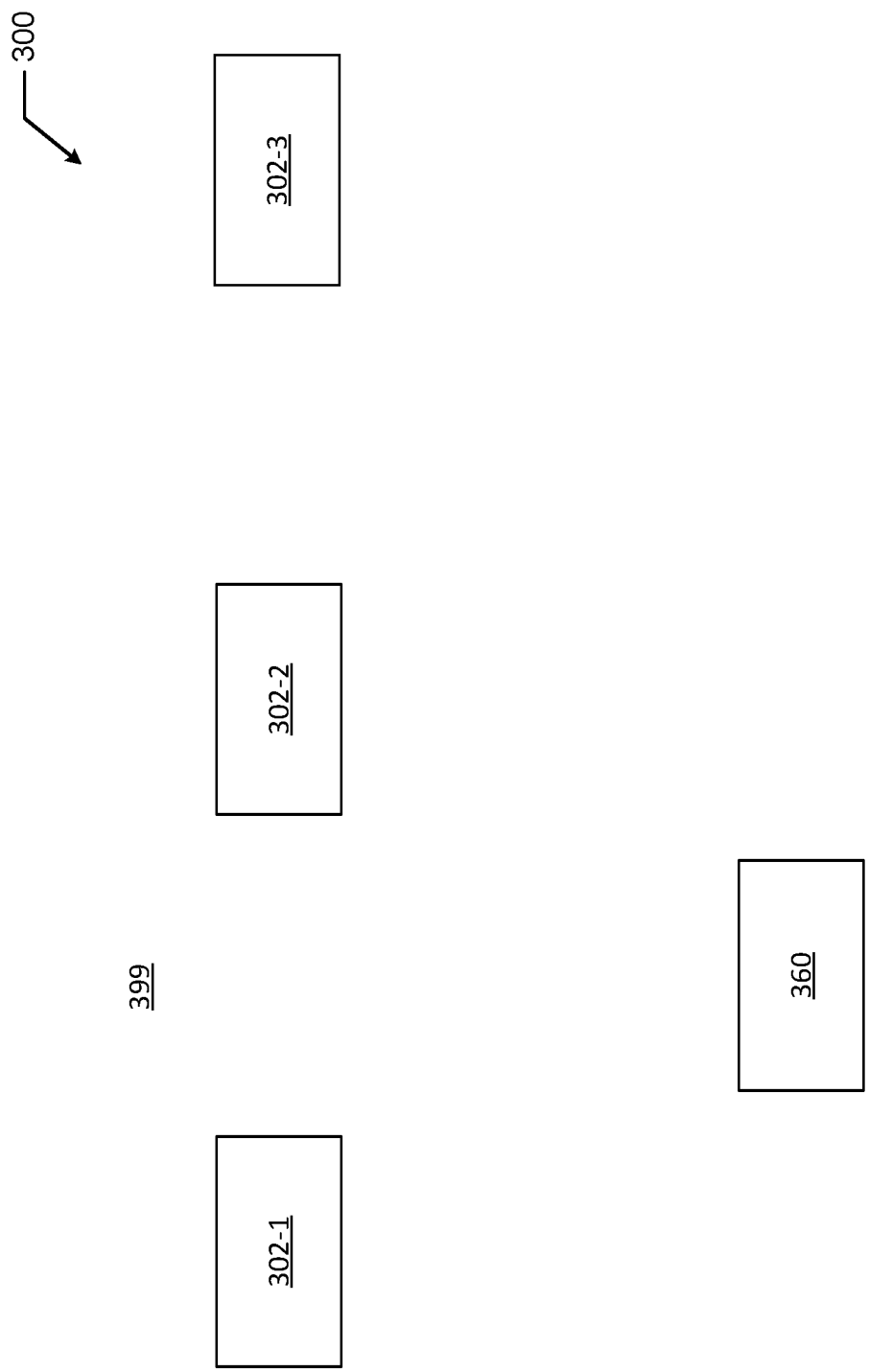
Figure 3B:
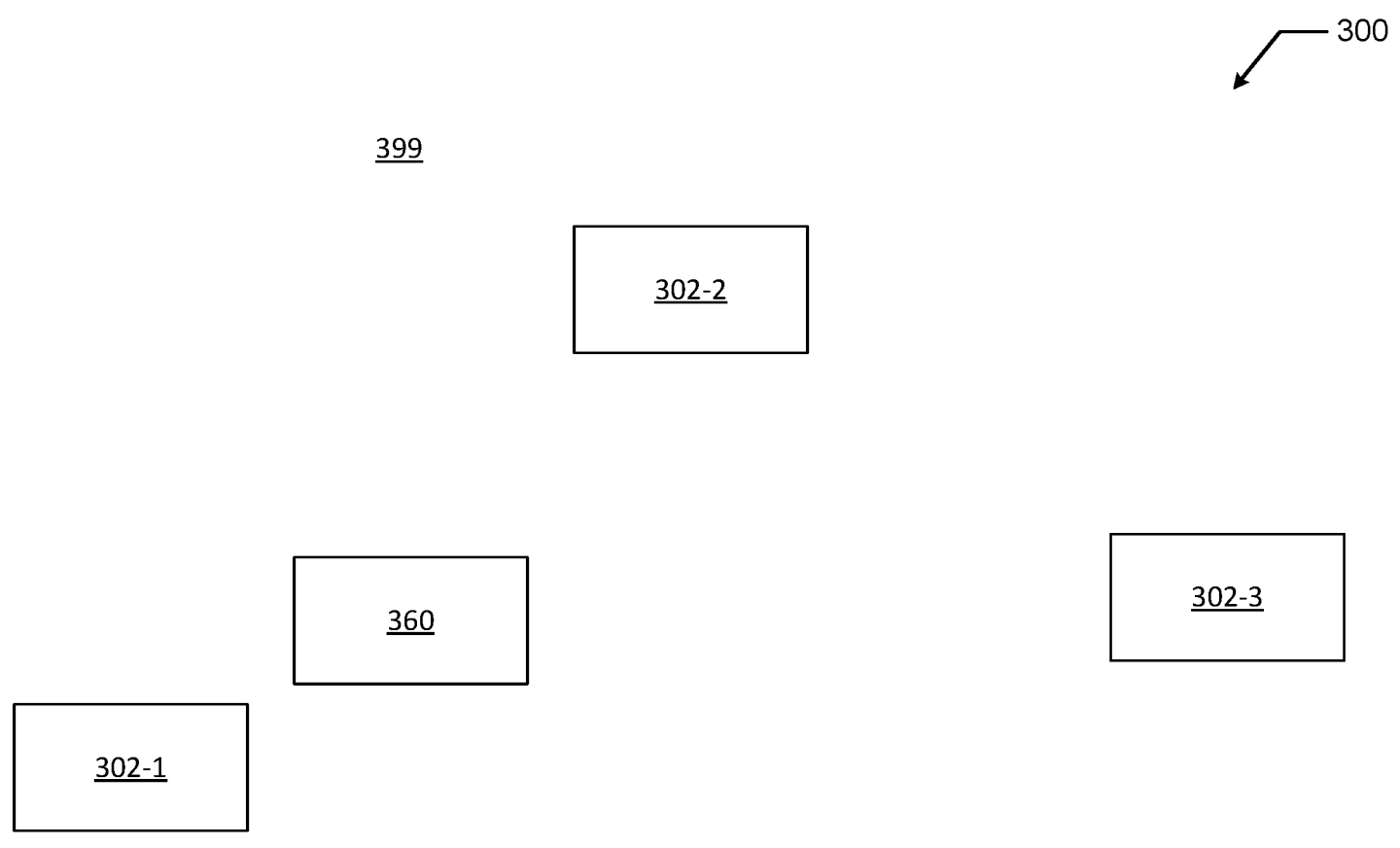

FIGS. 3A and 3B show a side and top view, respectively, of a system 300 in which an object 360 is located in volume of space 399 in accordance with certain example embodiments. Referring to FIGS. 1-3B, also located in the volume of space 399 of FIGS. 3A and 3B are three light fixtures 302 (specifically, light fixture 302-1, light fixture 302-2, and light fixture 302-3), where the light fixtures 302 are types of electrical devices 102 of FIG. 1 above. As discussed above, the volume of space 399 can be of any size and/or in any location. For example, the volume of space 399 can be a room in an office building.

As shown in FIGS. 3A and 3B, all of the light fixtures 302 can be located in the volume of space 399. Alternatively, one or more of the light fixtures 302 can be located outside the volume of space 399, as long as the RF signals (e.g., RF signals 195) sent by the transceiver 124 of the light fixture 302 are received by the object 360, and as long as the RF signals sent by the object 360 are received by the transceiver 124 of the light fixture 302, as applicable.

FIG. 4 shows the system 400 of FIGS. 3A and 3B when RF signal 495 is sent by one of the light fixtures 302 in accordance with certain example embodiments. Referring to FIGS. 1-4, light fixture 302-1 broadcasts RF signal 495. Each light fixture 302 has a broadcast range 482. In this case, light fixture 302-1 has broadcast range 482-1, light fixture 302-2 has broadcast range 482-2, and light fixture 302-3 has broadcast range 482-3. Since the object 360 is located within the broadcast range 482-1 for light fixture 302-1, the object 360 receives RF signal 495.

Figure 5:
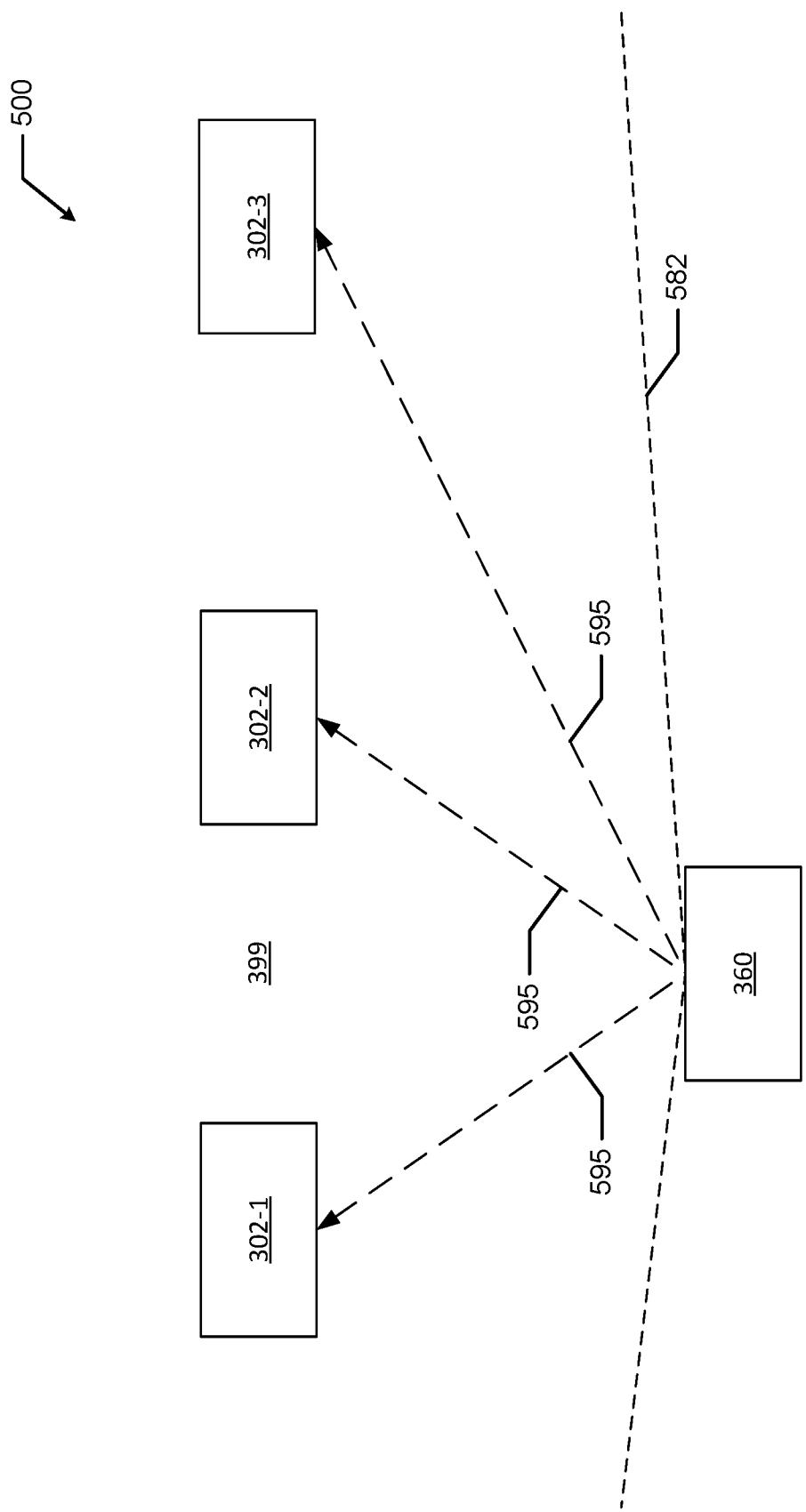
FIG. 5 shows the system of FIGS. 3A-4 when a return signal is sent by the object in accordance with certain example embodiments.

FIG. 5 shows the system 500 of FIGS. 3A-4 when RF signal 595 is sent by the object 360 in accordance with certain example embodiments. Referring to FIGS. 1-5, the RF signal 595 sent by the object 360 is in response to the RF signal 495 sent by light fixture 302-1, as shown in FIG. 4. As shown in FIG. 5, the object 360 broadcasts RF signal 595, which is received by all three light fixtures 302. As discussed above, the RF signal 595 broadcast by the object 360 can include the UUID of the object 360 as well as other code, such as identifying information of the light fixture 302-1 that sent the RF signal 495 that prompts generation of the signal 595 by the object 360.

The object 360 has a broadcast range 582, and all three of the light fixtures 302 are located within the broadcast range 582 of the object 360, FIG. 5 shows that all three of the light fixtures 302 receive RF signal 595. Because of the code identifying light fixture 302-1 in the RF signal 595, light fixture 302-1 receives and processes RF signal 595, while light fixture 302-2 and light fixture 302-3 ignore RF signal 595. Upon receiving RF signal 595, a total time (the time of flight) can be measured from when RF signal 495 was sent by light fixture 302-1 and when RF signal 595 was received by light fixture 302-1.

Figure 6:
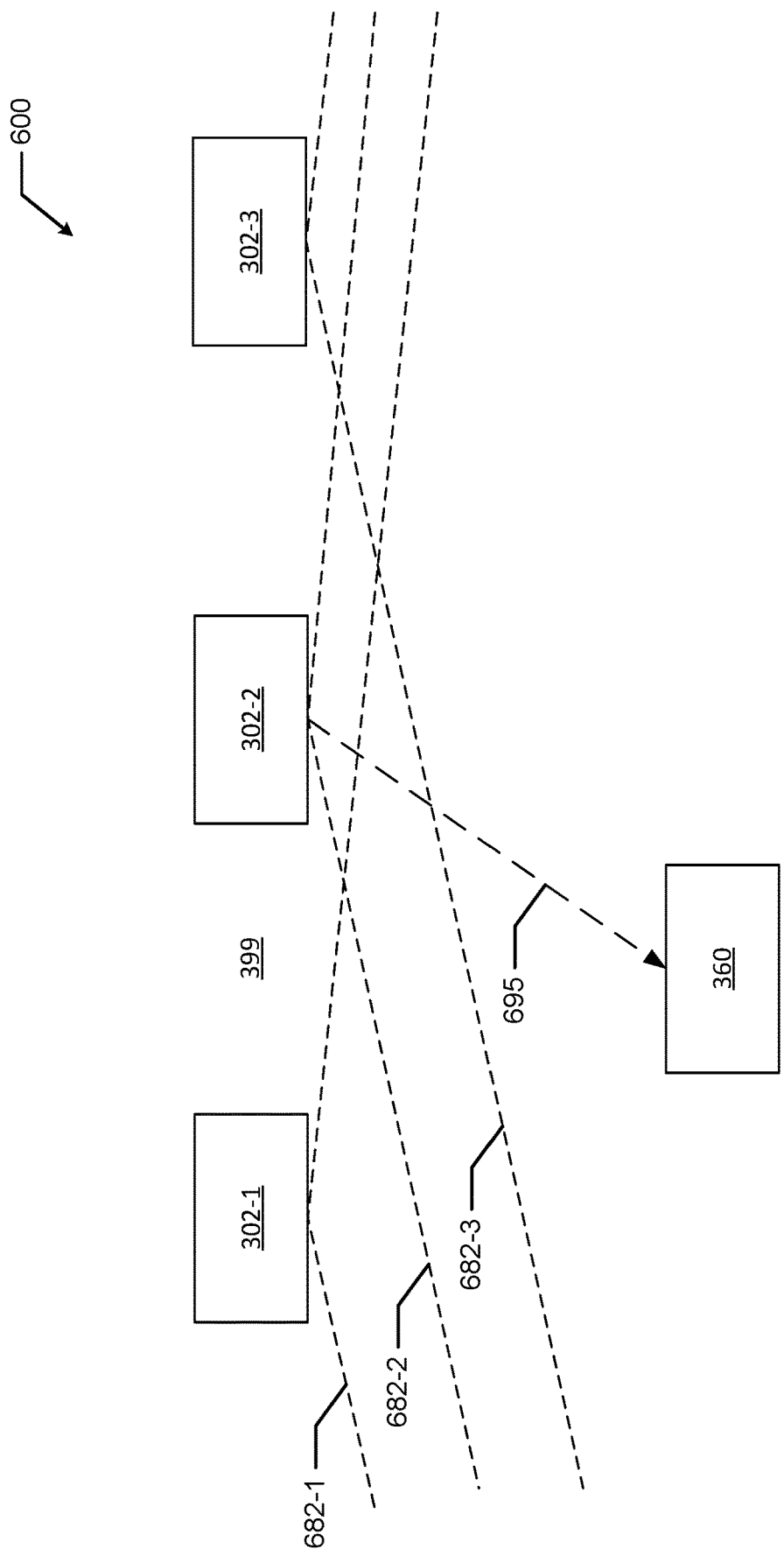
FIG. 6 shows the system of FIGS. 3A-4 when another signal is sent by another of the light fixtures in accordance with certain example embodiments.

FIG. 6 shows the system 600 of FIGS. 3A and 3B, at some point later in time relative to FIGS. 4 and 5, when RF signal 695 is sent by another one of the light fixtures 302 in accordance with certain example embodiments. Referring to FIGS. 1-6, light fixture 302-2 broadcasts RF signal 695. Since the object 360 is located within the broadcast range 482-2 for light fixture 302-2, the object 360 receives RF signal 695.

Figure 7:
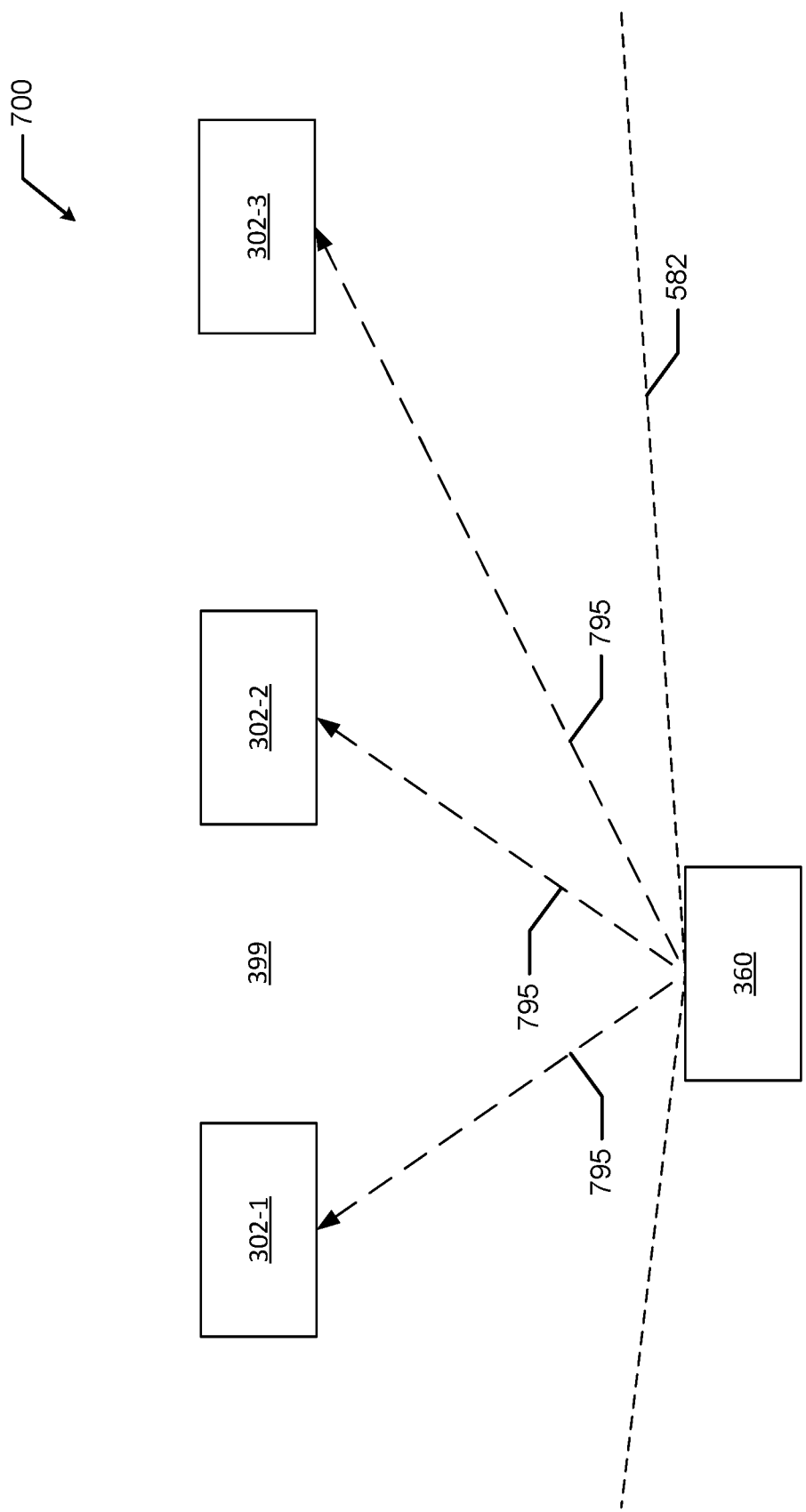
FIG. 7 shows the system of FIGS. 3A-4 when another return signal is sent by the object in accordance with certain example embodiments.

FIG. 7 shows the system 700 of FIGS. 3A-6 when RF signal 795 is sent by the object 360 in accordance with certain example embodiments. Referring to FIGS. 1-7, the RF signal 795 sent by the object 360 is in response to the RF signal 695 sent by light fixture 302-2, as shown in FIG. 6. As shown in FIG. 7, the object 360 broadcasts RF signal 795, which is received by all three light fixtures 302. As discussed above, the RF signal 795 broadcast by the object 360 can include the UUID of the object 360 as well as other code, such as identifying information of the light fixture 302-2 that sent the RF signal 695 that prompts generation of the signal 795 by the object 360.

As stated above, the object 360 has a broadcast range 582, and all three of the light fixtures 302 are located within the broadcast range 582 of the object 360, FIG. 7 shows that all three of the light fixtures 302 receive RF signal 795. Because of the code identifying light fixture 302-2 in the RF signal 795, light fixture 302-2 receives and processes RF signal 795, while light fixture 302-1 and light fixture 302-3 ignore RF signal 795. Upon receiving RF signal 795, a total time (the time of flight) can be measured from when RF signal 695 was sent by light fixture 302-2 and when RF signal 795 was received by light fixture 302-2.

Figure 8:
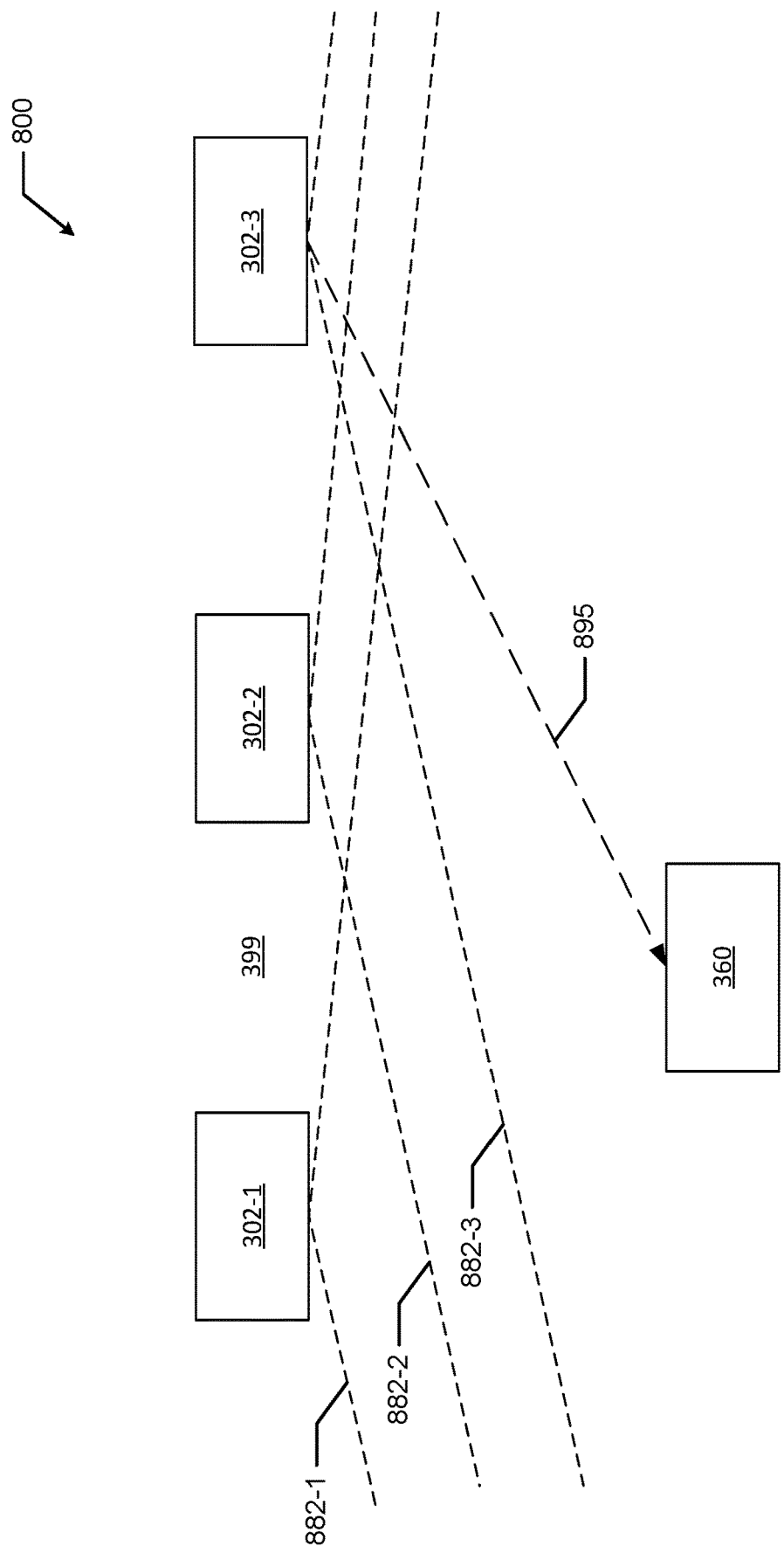
FIG. 8 shows the system of FIGS. 3A-4 when yet another signal is sent by another of the light fixtures in accordance with certain example embodiments.

FIG. 8 shows the system 800 of FIGS. 3A and 3B, at some point later in time relative to FIGS. 4 and 5, when RF signal 895 is sent by another one of the light fixtures 302 in accordance with certain example embodiments. Referring to FIGS. 1-8, light fixture 302-3 broadcasts RF signal 895. Since the object 360 is located within the broadcast range 482-3 for light fixture 302-3, the object 360 receives RF signal 895.

Figure 9:
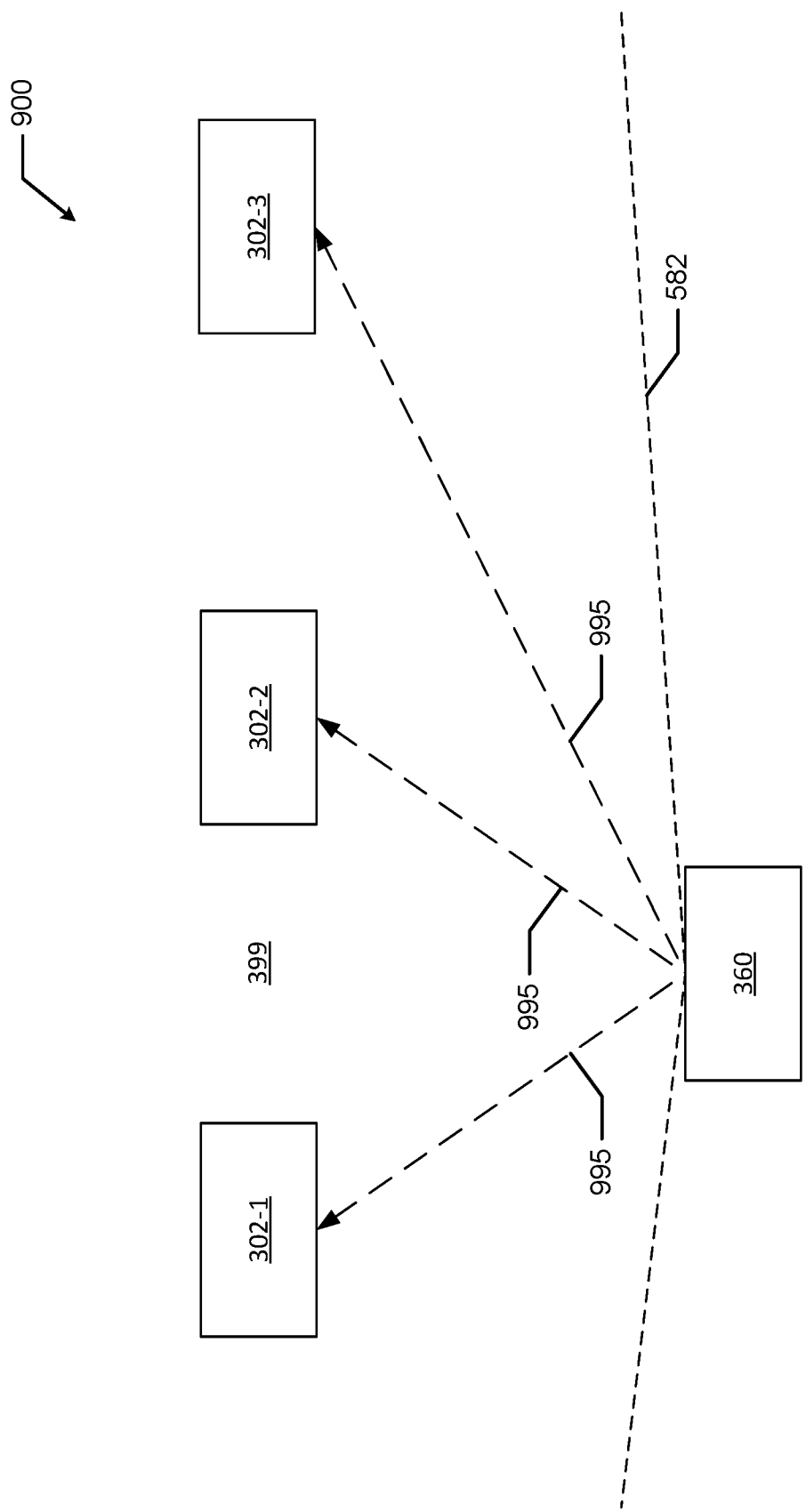
FIG. 9 shows the system of FIGS. 3A-4 when yet another return signal is sent by the object in accordance with certain example embodiments.

FIG. 9 shows the system 900 of FIGS. 3A-8 when RF signal 995 is sent by the object 360 in accordance with certain example embodiments. Referring to FIGS. 1-9, the RF signal 995 sent by the object 360 is in response to the RF signal 895 sent by light fixture 302-3, as shown in FIG. 8. As shown in FIG. 9, the object 360 broadcasts RF signal 995, which is received by all three light fixtures 302. As discussed above, the RF signal 995 broadcast by the object 360 can include the UUID of the object 360 as well as other code, such as identifying information of the light fixture 302-3 that sent the RF signal 895 that prompts generation of the signal 995 by the object 360.

As stated above, the object 360 has a broadcast range 582, and all three of the light fixtures 302 are located within the broadcast range 582 of the object 360, FIG. 9 shows that all three of the light fixtures 302 receive RF signal 995. Because of the code identifying light fixture 302-3 in the RF signal 995, light fixture 302-3 receives and processes RF signal 995, while light fixture 302-1 and light fixture 302-2 ignore RF signal 995. Upon receiving RF signal 995, a total time (the time of flight) can be measured from when RF signal 895 was sent by light fixture 302-3 and when RF signal 995 was received by light fixture 302-3.

In some cases, the order in which the various RF signals shown in FIGS. 4-9 can vary. For example, light fixture 302-3 can broadcast RF signal 895 before light fixture 302-1 broadcasts RF signal 495. As another example, light fixture 302-2 can broadcast RF signal 695 after light fixture 302-1 broadcasts RF signal 495 but before object 360 broadcasts RF signal 595 in response to RF signal 495.

When using trilateration methods, by using the ToF for each of the three RF signal pairs (in this case, RF signal 495 and RF signal 595, RF signal 695 and RF signal 795, and RF signal 895 and RF signal 995) and one or more algorithms in the storage repository 130, the three-dimensional location of the object 360 can be determined. If only two of the RF signal pairs is used, then the two-dimensional location of the object 360 can be determined.

As stated above, each light fixture 302 can have a controller (e.g., controller 104) that communicates with the controllers of the other light fixtures 302 to determine the multi-dimensional location of the object 360 in the volume of space 399. In such a case, a controller of one of the light fixtures 302 can gather the information (e.g., ToF) associated with the signal pairs and determine the multi-dimensional location of the object 360. Alternatively, the network manager 180 can gather the information received by each of the light sources 302 to determine the multi-dimensional location of the object 360.

In yet another alternative, if only one of the light fixtures (e.g., light fixture 302-2) has a controller, the three RF signals broadcast by the object 360 can be received and processed by that light fixture. In any case, one or more protocols (e.g., protocols 132) and/or one or more algorithms can be used to determine the multi-dimensional location of the object 360.

Figure 10:
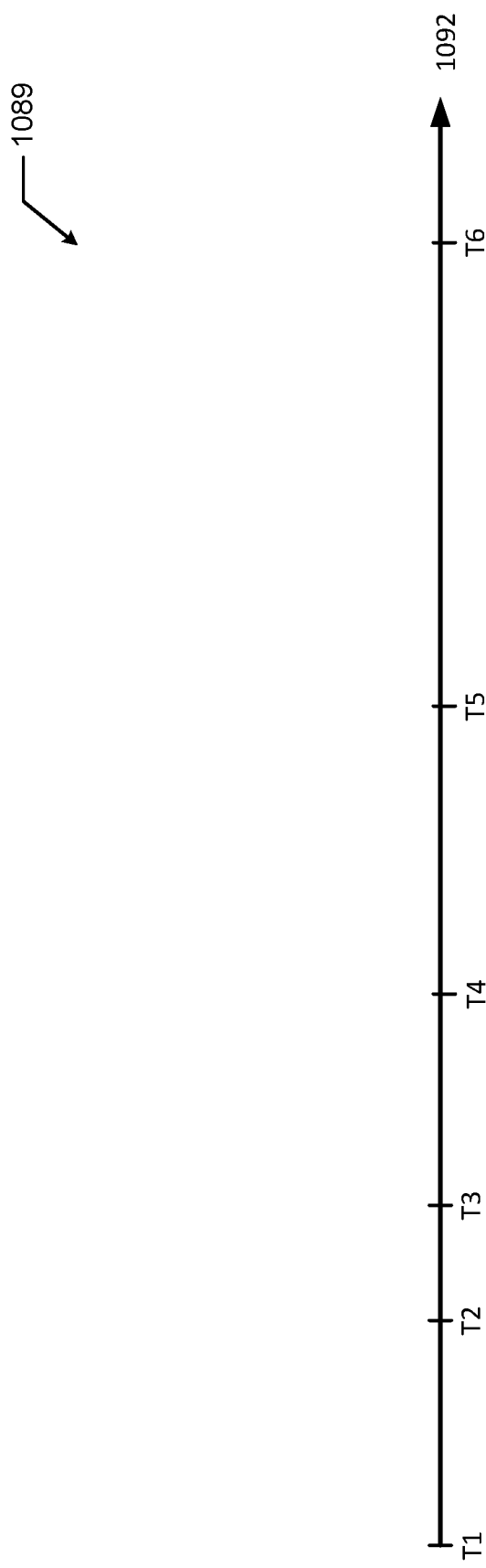
FIG. 10 shows a timeline of the various signals sent and received by the light fixtures as shown in FIGS. 3A-9 in accordance with certain example embodiments.

FIG. 10 shows a timeline 1089 of the various RF signals (e.g., RF signal 495, RF signal 595) transmitted between the light fixtures 302 and the object 360 as shown in FIGS. 3A-9 in accordance with certain example embodiments. Referring to FIGS. 1-10, the timeline 1089 of FIG. 10 shows how the delta ToF of each signal can be used to determine the multi-dimensional location of the object 360. The timeline 1089 of FIG. 10 shows a number of events over time 1092. In this case, T1 represents the time at which light fixture 302-1 broadcasts RF signal 495. T2 represents the time at which light fixture 302-1 receives and processes RF signal 595 broadcast by the object 360. T3 represents the time at which light fixture 302-2 broadcasts RF signal 695. T4 represents the time at which light fixture 302-2 receives and processes RF signal 795 broadcast by the object 360. T5 represents the time at which light fixture 302-3 broadcasts RF signal 895. T6 represents the time at which light fixture 302-3 receives and processes RF signal 995 broadcast by the object 360.

A timer (e.g., timer 110) can be used to mark each of these times and/or to establish the time of each RF signal pair. A control engine (e.g., control engine 106) of a controller (e.g., controller 104) of one or more light fixtures 302 can have access (via a storage repository 130) to any information (e.g., times measured by the timer 110; the amount of time for the object 360 to receive RF signal 495, process RF signal 495, generate a response RF signal 595, and send the RF signal 595; algorithms that use the measured and assumed data) needed to determine the multi-dimensional location of the object 360 in the volume of space 399.

In certain example embodiments, the timer (e.g., timer 110) creates a time stamp associated with each RF signal 195 that is sent and/or received by a light fixture. Similarly, the communication device 190 of an object 160 can, additionally or alternatively, have a timer that creates a time stamp for each RF signal 195 that the communication device 190 broadcasts. In this way, using the time stamps of the various RF signals 195, a control engine (e.g., of the network manager 180, of a controller 104 of a light fixture 102) can calculate the ToF of a RF signal pair. Those of ordinary skill in the art will appreciate that there are other ways that a timer can be used to help determine the ToF of a RF signal or pair of RF signals.

In one or more example embodiments, multiple electrical devices (e.g., light fixtures) use transceivers (rather than merely transmitters) to send out RF signals, the response to which from the object are used to determine the multi-dimensional location of the object in a volume of space. If two electrical devices are used, and if each electrical device includes only one communication point (e.g., antenna), then the location of the object can be defined in two dimensions. If three or more electrical devices are used, the location of the object can be defined in three dimensions. Alternatively, if there are only two electrical devices used, and if one or both of those electrical devices have multiple communication points (e.g., antennas), then the location of the object can be defined in three dimensions. Example embodiments can provide real-time location of an object in volume of space. Using example embodiments described herein can improve communication, safety, maintenance, costs, and operating efficiency.

Accordingly, many modifications and other embodiments set forth herein will come to mind to one skilled in the art to which multi-dimensional location of an object using multiple light fixtures pertain having the benefit of the teachings presented in the foregoing descriptions and the associated drawings. Therefore, it is to be understood that multi-dimensional location of an object using multiple light fixtures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an object in a volume of space, comprising:
    a first light fixture of a plurality of light fixtures, wherein the first light fixture comprises a first transceiver, at least one first light source, and a first controller, wherein the first controller:
        controls the at least one first light source to provide general illumination to a first portion of the volume of space;
        broadcasts, using the first transceiver, a first location signal into the volume of space;
        receives, using the first transceiver, a second location signal from the object in response to the first location signal;
        extracts first data of a first characteristic associated with the second location signal; and
        generates a third communication signal comprising the first data of the first characteristic;
    a second light fixture of the plurality of light fixtures, wherein the second light fixture comprises a second transceiver, at least one second light source, and a second controller, wherein the second controller:
        controls the at least one second light source to provide the general illumination to a second portion of the volume of space;
        broadcasts, using the second transceiver, a fourth location signal into the volume of space;
        receives, using the second transceiver, a fifth location signal from the object in response to the fourth location signal;
        extracts second data of the first characteristic associated with the fifth location signal; and
        generates a sixth communication signal comprising the second data of the first characteristic; and
    a master controller communicably coupled to the first controller and the second controller, wherein the master controller:
        receives the third communication signal send by the first controller and the sixth communication signal sent by the second controller; and
        determines, using the first data and the second data, a multi-dimensional location of the object in the volume of space,
    wherein determining the multi-dimensional location of the object in the volume of space is unrelated to providing the general illumination to the volume of space by the first light fixture and the second light fixture.

2. The system of claim 1, wherein the first characteristic of the second location signal comprises at least one selected from a group consisting of a phase of the second location signal, a distance traveled by the second location signal, and a signal strength of the second location signal.

3. The system of claim 1, further comprising:
    at least one non-light fixture electrical device located in the volume of space and communicably coupled to the master controller, wherein the at least one non-light fixture electrical device comprises an additional transceiver that broadcasts the plurality of first location signals and receives the plurality of second location signals, wherein the at least one non-light fixture electrical device further comprises a third controller that extracts third data of the first characteristic associated with a seventh location signal broadcast by the object, wherein the third controller sends an eighth location signal to the master controller, wherein the master controller further uses the third data in the eighth location signal to locate the object in the volume of space, wherein the third controller further performs a function for which the at least one non-light fixture electrical device is designed.

4. The system of claim 1, wherein the plurality of first location signals and the plurality of second location signals are radio frequency signals.

5. The system of claim 1, wherein the master controller determines the multi-dimensional location of the object in the volume of space by calculating a delta time of flight of the second location signal and the fifth location signal, wherein the delta time of flight is correlated to a first distance traveled by the second location signal and a second distance traveled by the fifth location signal.

6. The system of claim 1, wherein a plurality of light fixture locations of the plurality of light fixtures within the volume of space is known by the master controller.

7. The system of claim 1, wherein the multi-dimensional location of the object is determined by the master controller in two dimensions.

8. The system of claim 1, wherein the multi-dimensional location of the object is determined by the master controller in three dimensions.

9. The system of claim 1, wherein the second location signal comprises a first identification of the object.

10. The system of claim 9, wherein the first location signal comprises a second identification of the first light fixture.

11. The system of claim 1, wherein the master controller is part of one of the plurality of light fixtures.

12. The system of claim 1, wherein the second communication signal and the fifth communication signal are broadcast substantially simultaneously by the object.

13. The system of claim 1, wherein the master controller comprises a timer that creates a time stamp for the third location signal and the sixth location signal received by the transceiver.

14. The system of claim 1, wherein the first light fixture further comprises at least one antenna coupled to the transceiver.

15. The system of claim 14, wherein the first light fixture further comprises a switch coupled to the at least one antenna.

16. An object located in a volume of space, comprising:
    a communication module configured to:
    receive a first location signal from a first controller of a first light fixture of a plurality of light fixtures, wherein the first location signal is unrelated to a first primary function of providing general illumination to the volume of space by at least one first light source, controlled by the first controller, of the first light fixture;
    receive a second location signal from a second controller of a second light fixture of the plurality of light fixtures, wherein the second location signal is unrelated to a second primary function of providing general illumination to the volume of space by at least one second light source, controlled by the second controller, of the second light fixture;

interpret the first location signal and the second location signal;

generate a third location signal in response to the first location signal and the second location signal, wherein the third location signal comprises an identification of the object; and broadcast the third location signal to the plurality of light fixtures, wherein the third location signal is received by the first controller of the first light fixture and and the second controller of the second light fixture, wherein the first controller extracts first data associated with the third location signal, wherein the second controller extracts second data associated with the third location signal, and wherein the first data and the second data are used by a master controller, in communication with the first controller and the second controller, to determine a location of the object in the volume of space.

17. The object of claim 16, wherein the communication module moves over time within the volume of space.

18. The object of claim 16, wherein the communication module is further configured to:

receive a fourth location signal from a third controller of a third light fixture of the plurality of light fixtures, wherein the fourth location signal is unrelated to a third function performed providing general illumination to the volume of space by at least one third light source, controlled by the third controller, of the third light fixture;

interpret the fourth location signal;

generate a fifth location signal in response to the fourth location signal, wherein the fifth location signal comprises the identification of the object; and broadcast the fifth location signal to the plurality of light fixtures, wherein the fifth location signal is received by the third light fixture, wherein the third controller extracts third data associated with the fifth location signal, and wherein the third data of the fifth location signal is further used by the master controller to further to determine the location of the object in the volume of space.

19. A controller located in a light fixture of a plurality of light fixtures, the controller comprising:

a control engine communicably coupled to a master controller and the plurality of light fixtures located in a volume of space, wherein the control engine:

controls at least one light source to provide general illumination to the volume of space;

broadcasts, using a transceiver and simultaneously with controlling the at least one light source, a first location signal into the volume of space, wherein the first location signal is unrelated to controlling the at least one light source;

receives, using the transceiver, a second location signal sent by an object in response to the first location signal;

extracts first data of a first characteristic associated with the second location signal; and sends, using the transceiver, a third location signal to a master controller, wherein the third location signal comprises the first data associated with the second location signal, wherein the master controller determines a multi-dimensional location of the object in the volume of space using the first data.

20. The controller of claim 19, wherein the control engine broadcasts the first location signal based on an instruction received from the master controller.

* * * * *